United States Patent [19]

Raftis

[11] 4,372,528
[45] Feb. 8, 1983

[54] PINCH VALVE SLEEVE
[75] Inventor: Spiros G. Raftis, Pittsburgh, Pa.
[73] Assignee: Red Valve Co., Inc., Pa.
[21] Appl. No.: 280,827
[22] Filed: Jul. 6, 1981
[51] Int. Cl.³ ............................................. F16L 55/14
[52] U.S. Cl. ................................. 251/4; 251/5;
251/7; 251/127
[58] Field of Search ............... 251/4, 5, 7, 8, 127,
251/6; 138/37, 42

[56] References Cited
U.S. PATENT DOCUMENTS

| 1,461,039 | 7/1923 | Leslie | 251/127 |
|---|---|---|---|
| 1,720,244 | 7/1929 | Smith | 138/37 |
| 1,856,492 | 5/1932 | Marshall | 251/127 |
| 2,183,561 | 12/1939 | Hamblin | 138/37 |
| 2,558,816 | 7/1951 | Bruynes | 138/37 |
| 2,572,658 | 10/1951 | Perkins | 251/4 |
| 3,688,800 | 9/1972 | Hayner et al. | 138/42 |
| 3,741,216 | 6/1973 | Yosowitz | 251/5 |
| 4,004,615 | 1/1977 | Stern et al. | 138/37 |
| 4,172,580 | 10/1979 | Raftis et al. | 251/7 |
| 4,211,277 | 7/1980 | Grosz-Röll | 138/42 |

FOREIGN PATENT DOCUMENTS 1056327 2/1954 France .................................. 251/8

52-12775 1/1977 Japan ................................. 251/127

Primary Examiner—Alan Cohan
Assistant Examiner—John A. Rivell
Attorney, Agent, or Firm—Kirschstein, Kirschstein, Ottinger & Cobrin

[57] ABSTRACT

A pinch valve sleeve for reducing the pressure of fluid flowing therethrough with or without actuation of the valve's pinching mechanism. The valve sleeve features an elongated hollow flexible resilient elastomeric sleeve body having an inner surface circumferentially bounding a flow-through passage and peripheral flanges at both ends suitable for attachment to a section of a pipeline or conduit system. The sleeve body has an ingress section adjacent to the inlet opening of the valve sleeve, an egress section at the outlet opening which permits fluid egress, and a pinchable intermediate section situated between the ingress and egress sections. The inner surface of the sleeve body has thereon a plurality of radially-extending, inwardly-directed protrusions operative for impeding fluid flow through the flow-through passage of the sleeve, thus reducing the pressure so that the pressure of the fluid which exits through the outlet opening is lower than the pressure of the fluid entering the inlet opening.

11 Claims, 11 Drawing Figures

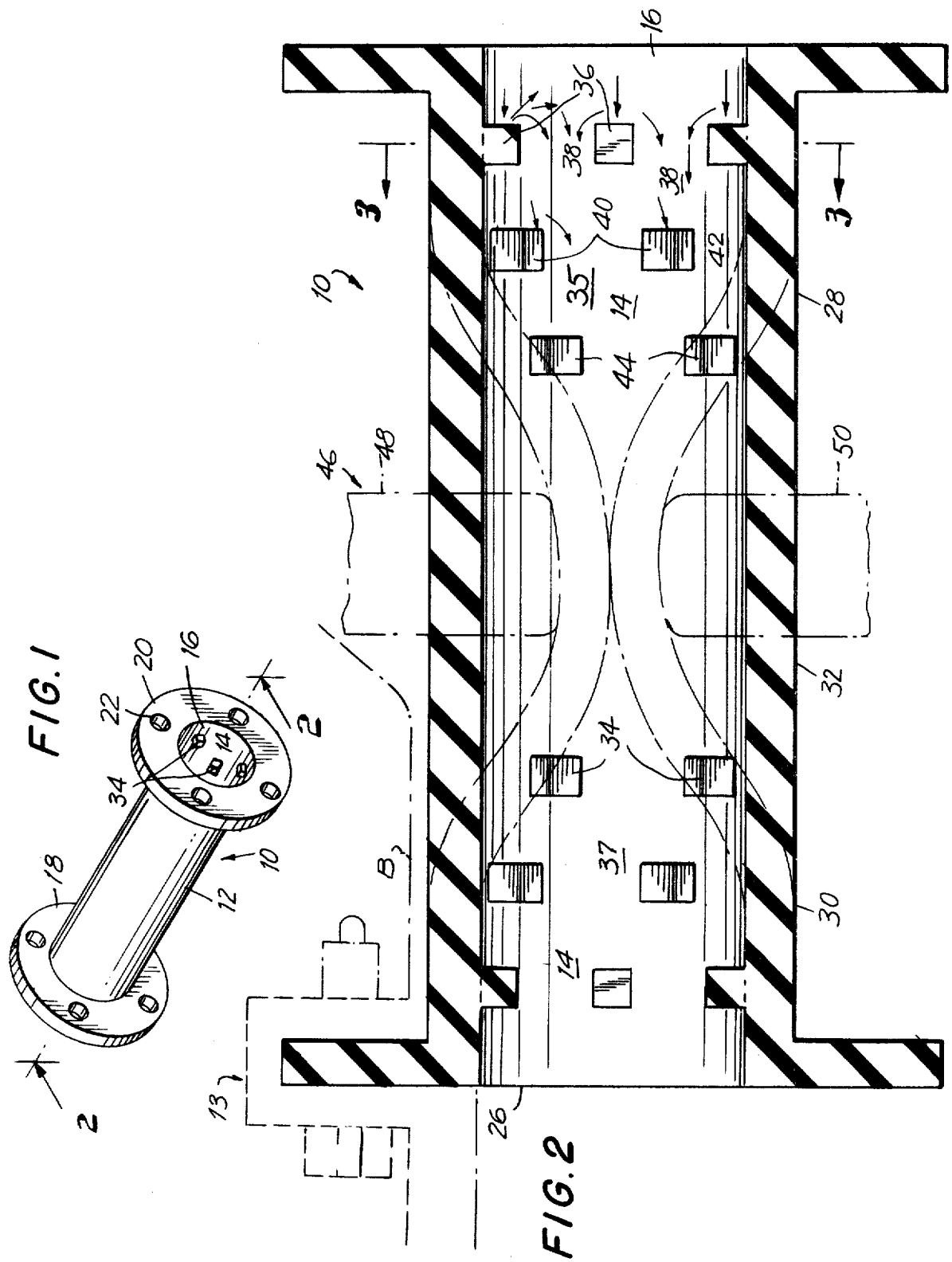

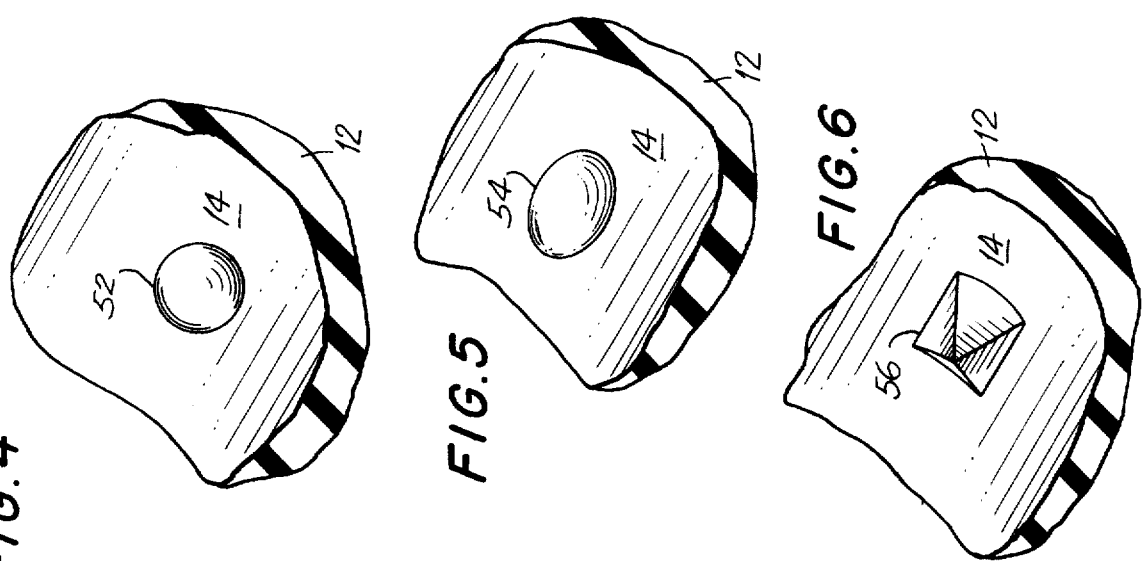
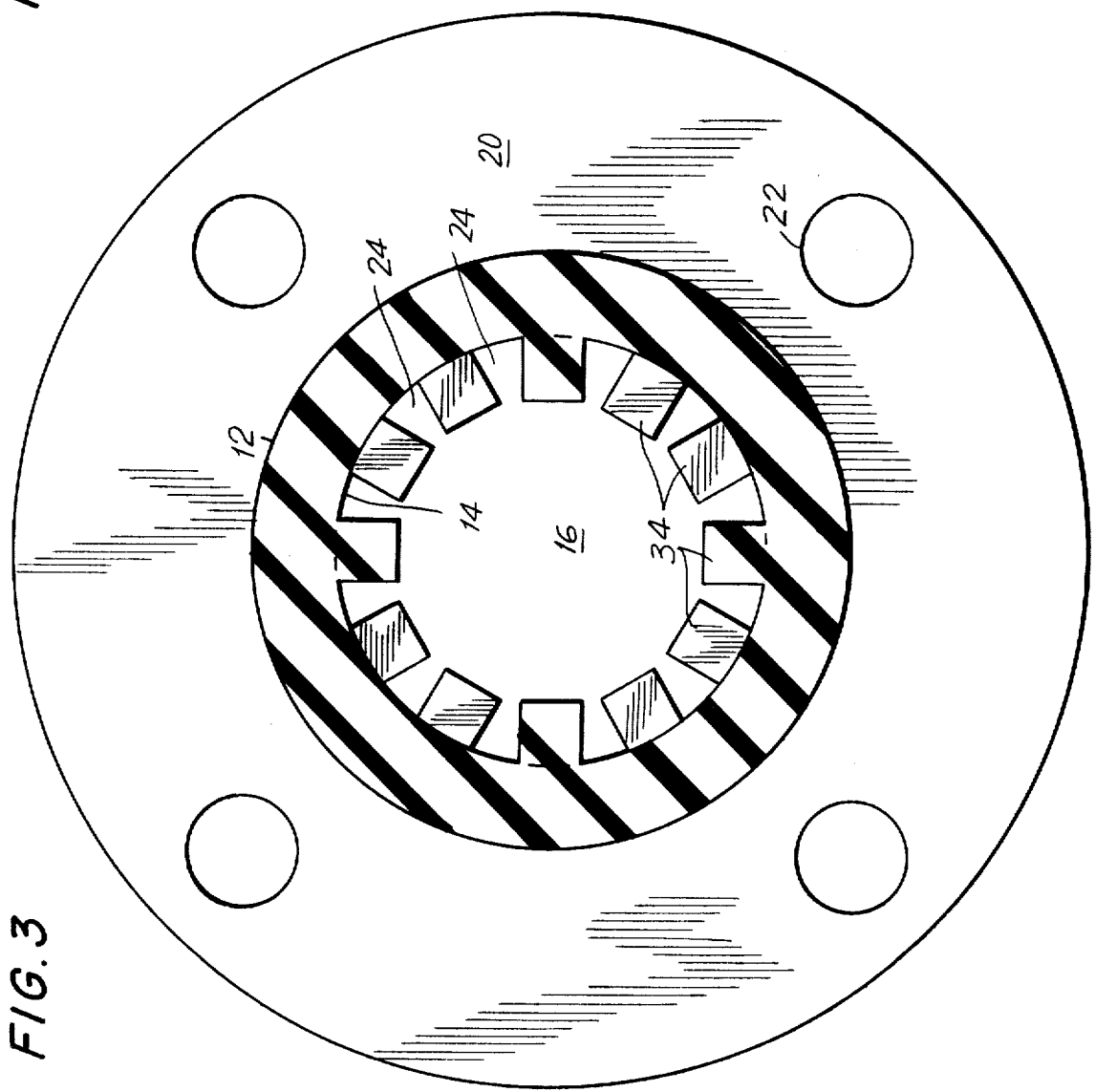

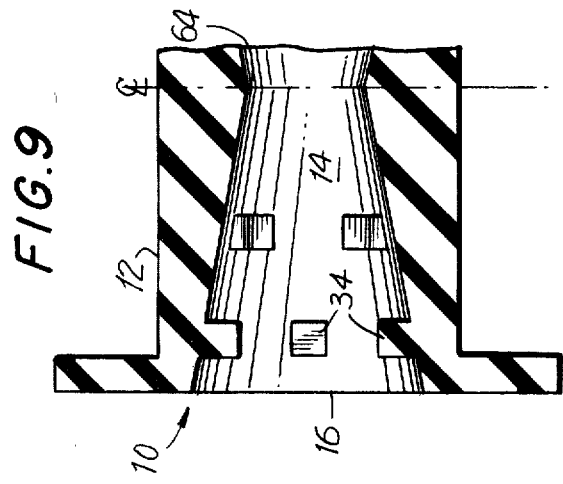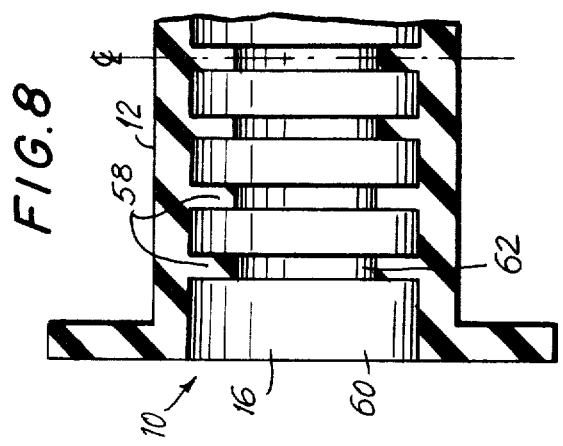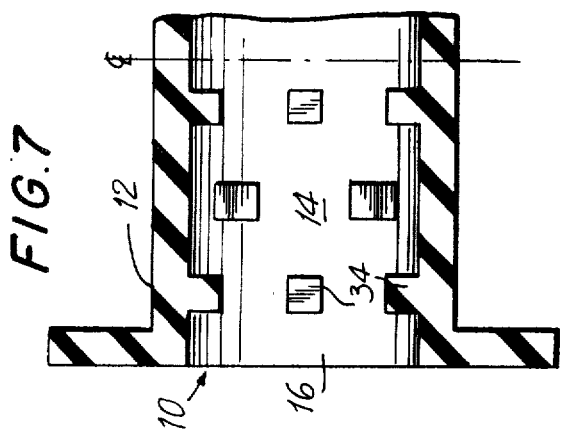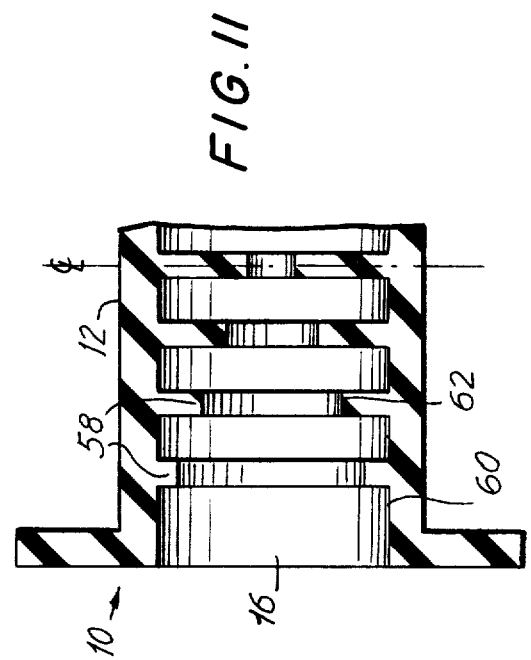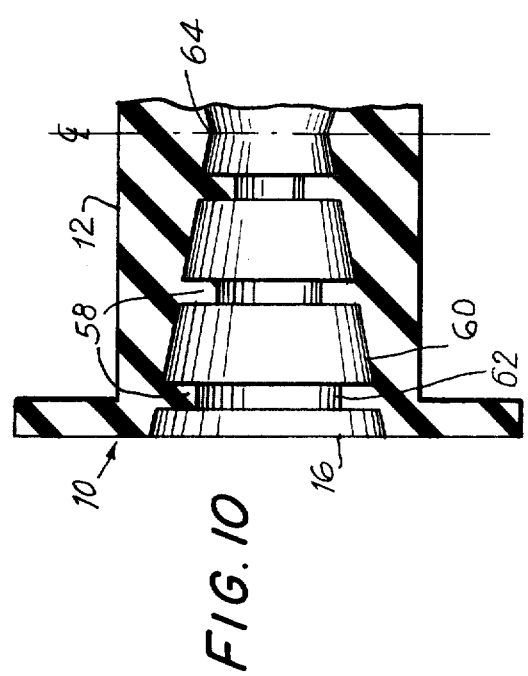

PINCH VALVE SLEEVE

BACKGROUND OF THE INVENTION

1. Field of the Invention

A pinch valve sleeve for reducing the pressure of fluid flowing therethrough.

2. Description of the Prior Art

Pinch valve sleeves are generally tubular and are constructed of a flexible resilient elastomeric material. They are positioned in a valve body which is interprosed in a conduit, duct, pipe or tube, together with means to constrict the sleeve intermediate its ends so as to curtail, terminate, or control the flow of fluid through the conduit or the like. Usually, the valve sleeve is concentrically oriented within an outer rigid valve housing and the sleeve is constricted by suitable means which squeezes the sleeve inwardly to deform or collapse the same and thus provide a smaller fluid flow passage.

Normally, a pinch valve sleeve is made from pure gum rubber, neoprene, Buna, butyl rubber, Hypalon, polyurethane, Viton, Teflon or silicon rubber. Typically, any suitable flexible and resilient material of construction may be employed for the sleeve. However, a synthetic rubber such as Hypalon, Buna, neoprene, an elastomeric plastic, or natural rubber is preferred. Hypalon is a rubbery material obtained by the chlorination and sulfonation of polyethylene. Buna is a rubber substitute prepared by the polymerization of butadiene. Neoprene is polychloroprene made by the polymerization of chloroprene; e.g. neoprene is a generic name for synthetic rubbers made by polymerization of 2-chloro-1, 3-butadiene (prepared by the action of hydrogen chloride on monovinylacetylene).

Pinch valve constructions have been used in a wide variety of situations. More specifically, pinch valve constructions have been used in controlling the flow of, by way of example, solids in suspension (either in slurry or air-conveyed form), especially abrasive materials such as metallic ores, asbestos, fiber, sand, coal, sugar, wood chips or pulps, paper stock, plastic pellets, raw sewage, talc, cement, fly ash, as well as for conveyance of various fluent chemicals and foodstuffs.

In some situations where pinch valves are utilized, the material being conveyed through the conduit, duct, pipe, or tube in which the valve is interposed enters the valve sleeve under a great deal of pressure and it is desirable to reduce the flow pressure so that the material will flow into the pipe or conduit portion downstream of the valve at a lower pressure than upstream of the valve. Examples of situations where such a pressure differential between the portion of a pipe or conduit upstream of a pinch valve and those downstream of the valve are desirable are in the mining and chemical industries where materials are being conveyed in, for example, slurry form at high pressure and a means built into the pipeline or conduit system, which means is capable of reducing the line pressure with or without actuation by any separate mechanical or other arrangement, is required.

The pinch valve sleeves of the prior art are not useful for providing a reduction in pressure as described hereinabove because they are generally constructed in such a fashion that their inner surfaces, which bound the flow-through passage, are of a smooth configuration and, thus, the fluid passing through the sleeve is not impeded or interfered with in any fashion and exits from the outlet opening of the valve under the same pressure as it was under when it entered the valve. In order to decrease the pressure of the fluid flowing through the valve, the pinching means must be actuated to squeeze the valve sleeve and thus provide a smaller flow-through passage.

The applicant is not aware of prior art patents or publications relating to pinch valve sleeves with internal obstructions, but among the prior art patents relating to pinch valve constructions generally may be mentioned U.S. Pat. Nos. 2,167,952; 2,660,395; 3,588,034; and 4,172,580.

SUMMARY OF THE INVENTION

1. Objects of the Invention

It is the object of the present invention to provide an improved pinch valve sleeve construction.

Another object is to provide a pinch valve sleeve which is useful for reducing the pressure of the fluid flowing therethrough.

A further object is to provide a pinch valve sleeve which can act as a pressure-reducing component of a pipe, duct, conduit or tube without requiring actuation of the pinching means of the valve.

An additional object of the present invention is to provide a pinch valve sleeve which provides better flow control when the pinching mechanism is actuated to constrict the sleeve body than prior art pinch valve sleeves.

Still another object is to provide a pinch valve sleeve with a sleeve body having protrusions on its inner surface that impede fluid flow through the sleeve's flow-through passage.

Yet another object of the present invention is to provide a pressure-reducing pinch valve sleeve wherein the protrusions on the inner surface of the sleeve body comprise annular flanges, discrete knobs, or similar protuberances.

Yet an additional object of the present invention is to provide a pressure-reducing pinch valve sleeve having a venturi-shaped flow-through passage.

Still a further object is to provide a pressure-reducing pinch valve sleeve that can be easily removed and replaced when the inner surface of the sleeve body or the protrusions thereon have become worn.

These and other objects and advantages of the present invention will become evident from the description that follows.

2. Features of the Invention

The pinch valve sleeve of the present invention comprises a hollow, flexible, resilient sleeve body having an inner surface circumferentially bounding a flow-through passage, and a means for attaching the sleeve to adjacent sections of a pipeline or conduit system, for example, peripheral flanges at both ends of the sleeve body. The sleeve body has an ingress section adjacent to the inlet opening in the sleeve through which fluid enters the sleeve and an egress section adjacent to the outlet opening through which fluid exits the sleeve. The sleeve body also has a pinchable intermediate section situated between the ingress section and the egress section.

A fluid stream flowing through the pinch valve in which the sleeve is mounted flows successively through the inlet opening of the valve sleeve, the ingress section of the sleeve body, the intermediate section of the sleeve body, the egress section, and, finally, the outlet opening of the valve sleeve.

The inner surfaces of the ingress and egress sections of the valve sleeve body have a plurality of protrusions, e.g., annular flanges or knob-like protuberances, arranged axially along the flow-through passage. The inner surface of the pinchable intermediate section can similarly have protrusions thereon or can be free of protrusions and thus have a smooth configuration. The pinching mechanism of the valve will be actuated to constrict the valve sleeve in the area of the intermediate section, and the protrusions on the inner surface of that section, if any, do not interfere with the pinching action because the protrusions are of resilient, elastomeric material and can be substantially flattened under the pressure of the pinching members so that flow-through passage can effectively be entirely closed off when desired. In fact, the presence of the protrusions in the intermediate section enables better flow control when the pinching mechanism is actuated than is achieved with prior art valve sleeves.

It will be appreciated by those skilled in the art that fluid flowing through the inlet opening of the valve sleeve and into the ingress section under a given pressure will be impeded or interfered with by the protrusions situated on the inner surface of the ingress section of the sleeve body and turbulent eddies will be created as the fluid flows around and past said protrusions. The pressure of the fluid will thus be decreased and energy lost through the interference of the protrusions with the axial fluid flow. The fluid then passes through the intermediate section where it may again encounter protrusions arranged circumferentially about and axially of the inner surface of that section. The fluid subsequently encounters the protrusions on the inner surface of the egress section. The interference of all protrusions on the inner surface of the valve sleeve substantially decreases the pressure of the fluid so that the fluid exiting through the outlet opening of the sleeve is at a substantially lower pressure than the fluid entering into the inlet opening of the sleeve.

BRIEF DESCRIPTION OF THE DRAWINGS

FIG. 1 is a perspective view of a pinch valve sleeve embodying the present invention.

FIG. 2 is an enlarged sectional view taken substantially along line 2—2 of FIG. 1, showing in phantom lines a pair of movable pinching members constricting the valve sleeve.

FIG. 3 is an enlarged sectional view taken substantially along line 3—3 of FIG. 2.

FIG. 4 is an enlarged fragmentary perspective view of a portion of a non-central inner surface of the valve sleeve showing a hemispherical protrusion on said surface.

FIG. 5 is a view similar to FIG. 4, showing a hemiovoid protrusion on said surface.

FIG. 6 is a view similar to FIG. 4, showing a square pyramidal protrusion on said surface.

FIG. 7 is a partial sectional view, analogous to FIG. 2, of a pinch valve sleeve having knob-like protuberances even on the inner surface of the intermediate section of the sleeve body.

FIG. 8 is a view similar to FIG. 7, showing a series of inwardly extending annular flanges on the inner surface of the sleeve body.

FIG. 9 is a view similar to FIG. 7 of a valve sleeve whose sleeve body has an inner surface contoured to provide a venturi-shaped flow-through passage, said surface having knob-like protuberances in the ingress and egress sections of the sleeve body and no protuberances in the intermediate section thereof.

FIG. 10 is a view similar to FIG. 9, showing a series of annular flanges on said venturi-shaped inner surface, said flanges being situated along the entire length of the sleeve body, including the intermediate section thereof.

FIG. 11 is a view similar to FIG. 8, showing flanges on said inner surface of progressively greater outer annular radius as their proximity to the center of the sleeve increases.

DETAILED DESCRIPTION OF THE PREFERRED EMBODIMENTS

Referring now to the drawings, and particularly to FIG. 1, the pinch valve sleeve of the present invention is denoted generally as 10 and comprises a circular tubular sleeve body 12 with an inner surface 14 bounding a flow-through passage 16. The sleeve is adapted to be mounted in a conventional valve body B provided with pinching means. Opposed peripheral outwardly extending flanges 18 and 20 are molded or fabricated in one piece respectively to each end of the sleeve body 12. Flanges 18 and 20 are each provided with a plurality of randomly or equidistantly spaced equi-radial through holes 22 parallel to the longitudinal axis of the sleeve body 12, through which bolts or other fastening means may be passed to attach the flanges to flanges at the adjacent ends of pipe or conduit sections or to a coupling or fitting 13 shown in phantom in FIG. 2, thus positioning the valve sleeve 10 in a pipeline or conduit system and permitting fluid flow therethrough.

Although the use of peripheral flanges on the sleeve body is illustrated for connecting the sleeve to adjacent pipe or conduit sections, a variety of connecting means familiar to those skilled in the art may be utilized for the same purpose.

As shown in FIG. 2, the valve sleeve 10 has an inlet opening 24 through which fluid flows into the flow-through passage 16 when the valve sleeve has been positioned in a pipeline or conduit system as previously described, and an outlet opening 26 through which fluid exits the flow-through passage 16 of the valve sleeve 10. The sleeve body 12 comprises an ingress section 28 adjacent to the inlet opening 24, an egress section 30 adjacent to the inlet opening 26 and a pinchable intermediate section 32 situated between the ingress and egress sections.

Pursuant to the principal features of the invention, a plurality of protrusions in the form of radially inwardly extending discrete knob-like protuberances 34, shown in FIG. 2 as teeth having the configurations of rectangular solids, are provided on the inner surfaces 35 and 37 of the ingress and egress sections respectively and are disposed circumferentially about and axially along said sections 35 and 37. Moreover, as shown in FIG. 2, the protuberances 34 are positioned on the inner surface sections 35 and 37 in a circumferentially staggered array so that a portion of the fluid flow entering the ingress section 28 through the inlet opening 24 encounters a first group of protuberances 36 mounted on the inner surface section 35 and is diverted around said protuberances in an eddying pattern until it proceeds to flow through the gaps 38 between the protuberances 36 substantially in the direction of the outlet opening of the sleeve. A second group of protuberances 40 is provided downstream of the first group 36 and is oriented to obstruct and impede the straight line flow of fluid emerging from the gaps 38, causing the fluid to be diverted around the protuberances 40 and to flow in an eddying fashion until it can proceed through the gaps 42 between the protuberances 40. A third group of protuberances 44 is provided downstream of the protuberances 40 which will be encountered by the fluid flowing in a straight line through the gaps 42 between the protuberances 40 causing further impedance of the fluid flow.

Any number of such groups of protuberances can be arranged along the length of the inner surface of ingress section 28 and circumferentially staggered to cause successive sites of interference with the fluid flowing through the ingress section. The radial heights of the protuberances can vary quite widely; typically between about one-tenth to about one-third of the radius of the sleeve.

As illustrated in FIG. 2, the intermediate section 32 of the sleeve body 12 is free of protuberances on its inner surface and the fluid emerging from the ingress section is thus free to flow through the intermediate section 32 without any further hindrance.

A fragmentary phantom view is shown in FIG. 2 of a conventional pinching mechanism 46 having opposed transversely displaceable pinching members 48, 50 which may be relatively moved to constrict the intermediate section 32 of the valve sleeve body 12, thus obstructing fluid flow through the flow-through passage 16 up to the point where the intermediate section 32 of the valve sleeve body is totally closed, whereupon fluid flow through the sleeve is entirely stopped. A fully closed central section 32 is shown in phantom lines in FIG. 2.

The pinching action necessary to close the valve sleeve body 12 can also be provided by hydraulic or air pressure on the outer surface of the sleeve body generated by introducing pressurized fluid into the valve body B until the sleeve body has been constricted to the desired degree.

After the fluid emerges from intermediate section 32, it enters the egress section 30, shown in FIG. 2, which, in identical fashion to the ingress section 28, has successive, circumferentially staggered groups of protuberances provided on its inner surface 37 which cause eddying and turbulence and impede the fluid flow through the egress section 30.

The impedance of the fluid flow through the flow-through passage 16 which is caused by the protuberances 34 disposed around the inner surfaces 35 and 37 of the ingress section 28 and the egress section 30 effects a drop in the pressure of the fluid flowing through the passage 16 because of the energy that is dissipated when the fluid is diverted from its straight line flow and forced to eddy around each successive group of protuberances as the fluid proceeds downstream through the valve sleeve body 12. Thus, the fluid emerging from the outlet opening of the sleeve body 12 is at a lower fluid pressure than the fluid which enters the inlet opening of the valve sleeve body 12, even when the pinching mechanism 46 is not actuated to constrict the intermediate section 32 of the sleeve body 12 to any degree whatsoever.

FIG. 3 shows an enlarged view of the flow-through passage 16, looking axially down said passage through the inlet opening 24 of the sleeve body 12. The protuberances 34 which are oriented around the inner surfaces 35 and 37 of the ingress section 28 and the egress section 30 respectively in axially spaced staggered groups are shown to be circumferentially disposed about substantially the entire circumference of the flow-through passage so that a very large portion of the fluid flowing through the inlet opening 24 and subsequently through the flow-through passage 14 will encounter at least one protuberance and have its flow impeded before emerging from the outlet opening 26. Although a uniform axially spaced staggered circumferentially spaced array for the protuberances has been shown and described, other relative arrangements can be utilized.

FIGS. 4, 5, and 6 show various examples of shapes for the protuberances which are incorporated into the inner surface 14 of the valve sleeve body 12. Thus, in FIG. 4, a hemispherical protuberance 52 is showns. In FIG. 5, a hemi-ovoid protuberance 54 is shown. Finally, in FIG. 6, a square pyramidal protuberance 56 is shown which has its square base at the inner surface 14 of the valve sleeve body 12 and its apex extending radially and inwardly into the flow-through passage 16.

In accordance with another embodiment of the present invention, the valve sleeve body 12 may have protrusions on its inner surface 14 even in the intermediate section 32. In FIG. 7, for example, the inner surface 14 of the sleeve body 12 has a plurality of protrusions 34 in the intermediate section 32. The protrusions on the intermediate section 32 are sufficiently elastomeric and resilient to be substantially flattened under the pressure of the pinching mechanism. Moreover, excellent flow control can be achieved by constricting the intermediate section of the sleeve shown in FIG. 7 partially or entirely with the pinching mechanism.

The protrusions which are provided on the inner surface 14 of the valve sleeve body 12 in accordance with the present invention need not be discrete knob-like protuberances, but may also take a variety of other forms, including the form of inwardly extending annular flanges 58 spaced axially along the inner surface of the sleeve body, as shown in FIG. 8. As with the discrete knob-like protuberances, the annular flanges 58 can be provided only on the inner surfaces 35, 37 of the ingress section 28 and the egress section 30 of the sleeve body 12, or may be situated in the intermediate section 32 as well.

When annular flanges are provided on the inner surface 14 of the sleeve body, the flow-through passage 16 is divided into a series of alternating large-diameter chambers 60 and smaller-diameter chambers 62. The fluid flowing into the ingress section 28 through the inlet opening 24 first enters a large chamber 60 and then is forced to pass through a smaller chamber 62, whereby the pressure of the fluid is reduced. The pressure of the fluid is further reduced as it passes through the remainder of the ingress section 28, the intermediate section 32 and the egress section 30, because the fluid flow is repeatedly interfered with and impeded by the annular flanges 58 as it proceeds along the flow-through passage 16. Thus the fluid exiting the valve sleeve through the outlet opening 26 is under considerably lower pressure than the fluid entering the inlet opening 24.

Another embodiment of the present invention is illustrated in FIG. 9. The inner surface 14 of the sleeve body 12 is contoured to provide a venturi-shaped flow-through passage 16 with a narrow throat 64 substantially at the center of the sleeve body 12. In addition, knob-like protuberances 34 are provided on the inner surface 14 of the ingress section 28 and the egress section 30. Both the venturi-like shape of the flow-through passage and the protuberances 34 act to reduce the pressure of the fluid flowing therethrough.

As shown in FIG. 10, the inner surface 14 of the valve sleeve body 12 may be contoured to provide a venturi-like flow-through passage 16, and, in addition, have a series of annular flanges 58 spaced along the length of the sleeve body 12. As in the embodiment shown in FIG. 8, the flanges 58 divide the flow-through passage 16 into alternating large and smaller chambers, but because of the venturi-like shape of the flow-through passage, both the large chambers 60 and the smaller chambers 62 grow progressively smaller as their proximity to the narrow throat 64, which is substantially in the center of the valve sleeve body 12, increases. The combination of the venturi-shaped flow-through passage and the series of annular flanges 58 causes a substantial drop in pressure of fluid flowing through the valve sleeve.

In FIG. 11, a valve sleeve 10 is shown with a series of annular flanges 58 provided on the inner surface 14 of the sleeve body 12. The flanges 58 progressively increase in annular or outer radius as their proximity to the center of the valve sleeve body 12 increases. The flow-through passage 16 is thus divided into a series of large chambers 60 and smaller chambers 62, said large chambers remaining of constant diameter while said smaller chambers progressively decrease in diameter as their proximity to the center of the sleeve body increases.

In accordance with the preferred embodiments of the present invention, the pinch valve sleeve body 12 is molded or hand fabricated from any one of a variety of durable long-wearing resilient elastomeric materials, including those heretofore described. When the valve sleeve does become worn, however, it can be easily removed from the pipeline or conduit system by detaching the end flanges 18 and 20 from the adjacent pipe or conduit sections. A new valve sleeve can then be positioned in the valve body.

While the invention has been illustrated and described as a pinch valve sleeve operative for reducing the pressure of the fluid flowing therethrough in a pipeline or conduit system, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various mechanisms without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a pressure-reducing pinch valve adapted to be mounted in a hollow valve arrangement having pinching means, said arrangement being adaptable for interposition in a conduit system adapted for conveying pressurized fluid material, a hollow, flexible, resilient elongated valve sleeve body fabricated in one piece from a resilient elastomeric material with an inner surface bounding a flow-through passage for the pressurized fluid material, said sleeve body having:
   (a) means providing an inlet opening at one end for permitting ingress of fluid material at a predetermined pressure into the flow-through passage;
   (b) means providing an outlet opening at an opposite end for permitting egress of fluid material at a reduced pressure that is lower than said predetermined pressure from the flow-through passage;
   (c) an ingress section adjacent to the inlet opening;
   (d) an egress section adjacent to the outlet opening;
   (e) a pinchable intermediate section situated between said ingress and egress sections and constrictable by the pinching means; and
   (f) means for reducing the pressure of the fluid material from said predetermined pressure to said reduced pressure, including a plurality of mutually spaced, radially extending, inwardly directed protrusions on the inner surface of the sleeve body and formed of one-piece elastomeric construction therewith, said protrusions being operative for reducing the pressure of the pressurized fluid material even when the pinching means is not operative to constrict the pinchable intermediate section, whereby greater control over the pressurized fluid flow is obtained regardless of the operation of the pinching means.

2. A pinch valve sleeve body according to claim 1, wherein said protrusions are disposed axially along the inner surfaces of the ingress and egress sections, with the inner surface of the intermediate section being substantially free of said protrusions.

3. A pinch valve sleeve body according to claim 1, wherein said protrusions are disposed axially along the inner surfaces of the ingress, egress, and intermediate sections.

4. A pinch valve sleeve body according to claim 1, wherein said protrusions comprises discrete knob-like protuberances.

5. A pinch valve sleeve body according to claim 1, wherein said protrusions comprise annular flanges.

6. A pinch valve sleeve body according to claim 1 wherein there is additionally provided means for connecting the sleeve body to adjacent sections of the conduit system.

7. A pinch valve sleeve body according to claim 6 wherein said connecting means comprises a pair of peripheral flanges affixed respectively to opposite ends of said sleeve body, said flanges being adapted for attachment to adjacent portions of the conduit system so as to permit flow through the sleeve body.

8. A pinch valve sleeve body according to claim 1 wherein said body is of a circular tubular shape.

9. A pinch valve sleeve body according to claim 1 wherein said inner surface is contoured so that the flow-through passage is substantially venturi-shaped.

10. A pinch valve sleeve body according to claim 4 wherein said protuberances are substantially mutually equidistantly spaced circumferentially about the inner surface of said sleeve body.

11. A pinch valve sleeve body according to claims 4 or 5 wherein said protrusions are substantially mutually equidistantly spaced axially along the inner surface of said sleeve body.

* * * * *